United States Patent [19]
Zhang

[11] Patent Number: 6,139,147
[45] Date of Patent: Oct. 31, 2000

[54] ACTIVELY CONTROLLABLE MULTIFOCAL LENS

[75] Inventor: Xiaoxiao Zhang, Suwanee, Ga.

[73] Assignee: Novartis AG, Basel, Switzerland

[21] Appl. No.: 09/196,990

[22] Filed: Nov. 20, 1998

[51] Int. Cl.[7] .............................. G02C 7/04; G02B 5/32; B29D 11/00
[52] U.S. Cl. .......................... 351/161; 351/177; 359/19; 264/1.31; 264/1.36
[58] Field of Search .......................... 351/160 R, 160 H, 351/161, 162, 177; 359/15, 19; 264/1.31, 1.36

[56] References Cited

U.S. PATENT DOCUMENTS

| | | | |
|---|---|---|---|
| 4,210,391 | 7/1980 | Cohen | 351/161 |
| 4,637,697 | 1/1987 | Freeman | 351/161 |
| 4,641,934 | 2/1987 | Freeman | 351/159 |

(List continued on next page.)

FOREIGN PATENT DOCUMENTS

| | | |
|---|---|---|
| 0 037 476 | 3/1981 | European Pat. Off. . |
| 0 404 099 | 6/1990 | European Pat. Off. . |
| 0 407 772 | 6/1990 | European Pat. Off. . |
| 0 407 773 | 6/1990 | European Pat. Off. . |
| 0 435 525 A2 | 12/1990 | European Pat. Off. . |
| 0 470 811 | 8/1991 | European Pat. Off. . |
| 0 570 120 | 4/1993 | European Pat. Off. . |
| 2 139 375 | 4/1984 | United Kingdom . |
| WO 94/12909 | 11/1993 | WIPO . |
| WO 94/23334 | 7/1994 | WIPO . |
| WO 96/10971 | 10/1995 | WIPO . |
| WO 96/24075 | 1/1996 | WIPO . |
| WO 97/10527 | 9/1996 | WIPO . |
| WO 97/13183 | 9/1996 | WIPO . |

OTHER PUBLICATIONS

Analysis of Multiple Hologram Optical Elements with Low dispersion and Low Aberrationis, John N. Lattta, Appled Optics, vol. 11(8), pp. 1686–1696 (Aug. 1972).

Bandwith of Holographic Optical Elements, Thomas Stone and Nicholas George, Optics Letters, pp. 445–447, vol. 7, No. 9 (Sep. 1982).

Compensating Optical Systems. Part 1: Broadband Holographic Reconstruction, Robert H. Katyl, Applied Optics, May 1972, vol. 11, No. 5, pp. 1241–1247.

Coupled Wave Theory for Thick Hologram Gratings, Herwig Kogeinik, The Bell System Technical Journal, vol. 48, No. 9, pp. 2909–2944, Nov. 1969.

Eye Contact GRIN Lenses, Yasuhiro Koike, Grandient Index Optical Systems, 1994 Technical Digest, Series vol. 12, pp. 87–93 (Jul. 1994).

Higher Diffraction Orders in On–axis Holographic Lenses, R.R.A. Syms and L. Solymar, Applied Optics, vol. 21 (18), pp. 3264–3268 (Sep. 1982).

History of Holography, Paul Kirkpatrick, SPIE Seminary Proceedings, vol. 15, pp. 9–19, 1968.

Holography: A Day in the Life, Holography Market Place, 5th Ed., B. Kluepfel, A. Rhody, F. Ross, pp. 147–154 (Oct. 1995).

Holography Takes On A Practical Look, Tung H. Jeong, Laser Focus World, pp. 89–99, Jul. 1989.

Hybrid Diffractive–Refractive lenses and Achromats, Thomas Stone and Nicholas George, Applied optics, vol. 27 (14), pp. 2960–2971, Jul. 1988.

Image Evaluation of Ophthalmi Devices, David S. Loshin, Optometry and Vision Science, vol. 6y7, No. 8, pp. 617–621, 1990.

(List continued on next page.)

Primary Examiner—Scott J. Sugarman
Attorney, Agent, or Firm—R. Scott Meece; Robert J. Gorman, Jr.

[57] ABSTRACT

The invention provides an active multifocal optical lens. The optical lens has a first optical element that provides a first optical power and a second optical element that provides a second optical power. The second optical element is a volume holographic optical element, which has been programmed to focus incoming light.

27 Claims, 7 Drawing Sheets

U.S. PATENT DOCUMENTS

| | | | |
|---|---|---|---|
| 4,642,112 | 2/1987 | Freeman | 623/6 |
| 4,655,565 | 4/1987 | Freeman | 351/159 |
| 4,913,990 | 4/1990 | Rallison | 430/30 |
| 4,978,183 | 12/1990 | Vick | 350/3.67 |
| 5,037,166 | 8/1991 | Malcolm et al. | 359/15 |
| 5,066,301 | 11/1991 | Wiley | 623/6 |
| 5,071,207 | 12/1991 | Ceglio et al. | 359/15 |
| 5,082,337 | 1/1992 | Chern et al. | 359/15 |
| 5,100,226 | 3/1992 | Freeman | 351/160 |
| 5,103,323 | 4/1992 | Magarinos et al. | 359/8 |
| 5,108,169 | 4/1992 | Mandell | 351/161 |
| 5,116,111 | 5/1992 | Simpson et al. | 351/161 |
| 5,162,927 | 11/1992 | Moss et al. | 359/3 |
| 5,178,636 | 1/1993 | Silberman | 351/161 |
| 5,182,180 | 1/1993 | Gambogi et al. | 430/1 |
| 5,235,441 | 8/1993 | Georgaras et al. | 359/15 |
| 5,257,132 | 10/1993 | Ceglio et al. | 359/565 |
| 5,291,316 | 3/1994 | Haberman | 359/13 |
| 5,296,881 | 3/1994 | Freeman | 351/177 |
| 5,331,132 | 7/1994 | Freeman | 219/121.69 |
| 5,331,445 | 7/1994 | Dickson et al. | 359/15 |
| 5,351,321 | 9/1994 | Snitzer et al. | 385/10 |
| 5,351,324 | 9/1994 | Forman | 385/37 |
| 5,422,745 | 6/1995 | Williams et al. | 359/3 |
| 5,424,828 | 6/1995 | Minami | 356/348 |
| 5,432,623 | 7/1995 | Egan | 369/102 |
| 5,443,507 | 8/1995 | Jacobi | 623/6 |
| 5,450,378 | 9/1995 | Hekker | 369/102 |
| 5,508,317 | 4/1996 | Mueller | 522/85 |
| 5,523,993 | 6/1996 | Freeman | 369/109 |
| 5,553,091 | 9/1996 | Delorme | 372/50 |
| 5,568,496 | 10/1996 | Justus et al. | 372/11 |
| 5,582,474 | 12/1996 | Van Order et al. | 362/74 |
| 5,587,847 | 12/1996 | Chiang et al. | 359/890 |
| 5,602,657 | 2/1997 | Dickman et al. | 359/15 |
| 5,612,986 | 3/1997 | Howells et al. | 378/31 |

OTHER PUBLICATIONS

Lens Aberration by Holography (correction), Teruji Ose, et al., pp. 57–69.

The Holographic Bifocal Contact Lens, Suzanne St. Cyr, Holospher, 15, 5, 14 pp. 14–24, 1988.

Wavelength Performance of Holographic Optical Elements, Thomas Stone and Nicholas George, Applied Optics, Nov. 1985, vol. 24, No. 22, pp. 3797–3810.

ACTIVELY CONTROLLABLE MULTIFOCAL LENS

BACKGROUND OF THE INVENTION

The present invention relates to a multifocal lens containing a holographic element and providing at least two optical powers.

Various bifocal lens design concepts for ophthalmic lenses, which are placed on or in the eye to correct visual defects, e.g., contact lenses and intraocular lenses, are available. One conventional bifocal ophthalmic lens design is the concentric simultaneous vision type. A concentric simultaneous bifocal lens has alternating optical zones that are concentrically placed. The concentric alternating optical zones have different radii of curvature to provide separate powers for near images and far images and, thus, focus near and far images onto a common focal region. Although concentric simultaneous bifocal lenses have been available for some time, they have not been used widely. This is because images projected on the retina by a concentric simultaneous bifocal lens are composed of both near and far images, and the overlapping images make neither of the near and far images completely clear. For example, when a distant object is viewed through a concentric simultaneous bifocal lens, images of near objects are simultaneously present, veiling or fogging the image of the distant object. In addition, because the light entering the concentric simultaneous bifocal lens is shared by the two optical zones, contrast and intensity of the focused images are sacrificed, especially under low light conditions.

Another conventional bifocal ophthalmic lens design is the diffractive simultaneous vision type. These lenses have a diffractive optical element and a refractive optical element, and utilize both optical elements to simultaneously project distant and near images on the retina. As with concentric simultaneous bifocal lenses, a diffractive simultaneous bifocal lens splits the light entering the eye into near and far images and projects the images simultaneously on the retina. Consequently, neither of the near and far images is completely clear and creates the contrast and intensity problem under low light conditions.

Yet another conventional bifocal ophthalmic lens design is the translating type. A translating bifocal constant lens generally follows the design of a conventional bifocal lens for eye glasses. A translating lens has two distinct localized viewing sections that have different optical powers. The position of the bifocal lens on the eye must shift from one section to the other when the wearer wishes to see objects that are located at a distance different from the objects currently in focus. One major problem inherent in a conventional translating bifocal ophthalmic lens is the difficulty encountered when the wearer tries to shift the position of the lens on the eye. The lens must move or shift a relatively large distance on the eye to change from one viewing section to the other, and the shift from one viewing section to the other must be complete before clear vision can be realized.

Recently, actively controllable approaches for providing a bifocal function in an ophthalmic lens have been proposed. A simultaneous vision type bifocal lens having sectionally-applied thermocromic coatings is an example. The bifocal lens is designed to activate the thermocromic coating on the distant optical zone of the lens, when the wearer looks down to focus on a near object. The activated thermocromic section of the lens blocks light from going through the distant optical zone, thereby preventing the veiling or fogging affect of the light originating from near objects. This approach is not highly practical in that currently available thermocromic coating materials do not activate and deactivate fast enough for the concept to be practical. Another approach uses a lens that charges its focal length with an aid of a switchable battery or photocell. This approach also is not currently practical in that the electronic circuitry and the power source must be made small enough to be packaged in an ophthalmic contact lens and must be highly reliable and durable.

There remains a need for an ophthalmic lens that reliably provides multifocal functions without the deficiencies of prior art multifocal lenses.

SUMMARY OF THE INVENTION

There is provided in accordance with the present invention a multifocal lens containing a volume holographic optical element, which provides an optical power. The lens has more than one optical power, and one of the optical powers can be actively and selectively controlled by the wearer of the lens to allow the wearer to see clear and unimpaired images. The lens is suitable for various optical lenses, including contact lenses, spectacle lenses and intraocular lenses.

One embodiment of the present invention provides a multifocal optical lens having a first optical element and a volume holographic optical element, wherein the first optical element provides a first optical power at a first focal point and the holographic optical element or the holographic optical element in combination with the first optical element provides a second optical power at a second focal point. Another embodiment provides a multifocal lens having a volume holographic optical element, wherein the holographic optical element has a programmed activating angle, and the optical element provides a first optical power, e.g., corrective power or plano, for light entering the optical element at an angle outside the activating angle and provides a second optical power for light entering the optical element at an angle within the activating angle.

The present invention also provides a method for correcting visual defects. The method has the steps of providing a multifocal lens on an eye and moving the multifocal lens on the eye such that an appropriate focal point is placed on the fovea of the eye. The multifocal lens can be characterized in that the multifocal lens has a first optical element and a volume holographic optical element, wherein the first optical element provides a first optical power at a first focal point and the holographic optical element or the holographic optical element in combination with the first optical element provides a second optical power at a second focal point. As another embodiment of the invention, the multifocal lens can be characterized in that the multifocal lens has a holographic optical element which has a programmed activating angle, wherein the optical element provides a first optical power for light entering the optical element at an angle outside the activating angle and provides a second optical power for light entering the optical element at an angle within the activating angle.

The multifocal lens of the present invention is a highly efficient corrective lens that that does not have the disadvantages of simultaneous vision lenses and conventional translating lenses.

DETAILED DESCRIPTION OF THE INVENTION

The present invention provides active multifocal ophthalmic lenses. The present invention additionally provides active multifocal lenses for spectacles. Hereinafter, the term "optical lenses" is used to indicate both ophthalmic lenses and spectacle lenses, unless otherwise indicated. The active optical lens of the invention provides more than one optical power. More specifically, the lens provides at least one optical power and at least one additional optical power that can be activated. Unlike conventional bifocal lenses, the present active multifocal lens can be actively and selectively controlled to provide one desired optical power at a time without or substantially without optical interferences from the other optical powers of the lens.

The active optical lens contains a holographic optical element (HOE), and suitable HOEs for the active optical lens are transmission volume HOEs. A volume HOE contains interference fringe patterns that are programmed as a periodic variation in the refractive index of the optical material. The periodic variation in refractive index creates planes of peak refractive index, i.e., volume grating structure, within the optical material. The planes of interference fringe pattern in the HOE is further discussed below.

Figure 1:
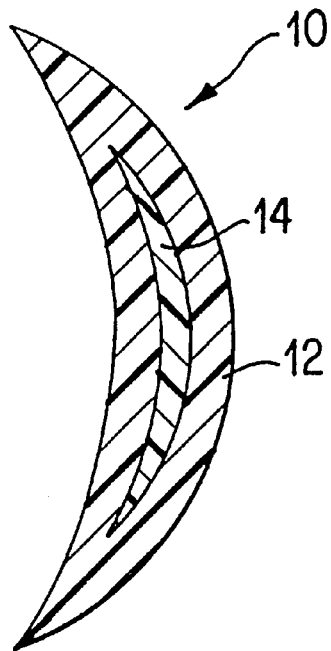
FIG. 1 illustrates an active ophthalmic lens of the present invention.

Turning to FIG. 1, the figure illustrates an exemplary active bifocal lens 10 of the present invention. It is to be noted that the invention is disclosed herein in reference to a bifocal optical lens for illustration purposes although the active optical lens of the present invention can have more than two optical powers. The lens 10 is a contact lens having a first optical element 12 and an HOE 14. The HOE 14 is embedded or encapsulated in the first optical element 12 to form the composite lens 10 such that the HOE 14 moves in conjunction with the lens 10. The first optical element 12 provides a first optical power, which corrects an effect of ametropia, e.g., myopia. Alternatively, the first optical element 12 can be a plano lens that functions as a carrier for the HOE 14. As for the HOE 14, the optical element is designed to modify the path of light only when the light enters the HOE 14 at a pre-programmed angle or within a pre-programmed angle range, i.e., activating angle, that activates the optical element. Accordingly, when the light enters at an angle that is outside the activating angle, the HOE 14 completely or substantially completely transmits the incoming light without significantly modifying or without modifying the path of the light. Alternatively stated, the HOE 14 may act as a plano lens except when the incident angle of the incoming light comes within the pre-programmed activating angle. When the HOE 14 is activated, the fringe patterns or volume grating structure programmed in the HOE 14 modifies the path of the light to provide an optical power that is different from the first optical power of the lens 10. In addition to the activatable optical power, the HOE 14 may also provide an optical power that results from the shape of the HOE 14 and the refractive index of the composition of the HOE 14. Such additional optical power complements the first optical material to provide the first optical power of the active lens 10 when the incoming light enters the lens 10 at an angle that does not active the HOE 14. The term "activating angle" as used herein indicates an incident angle of incoming light, which is defined by the angle formed by the advancing direction of incoming light and the axis normal to the HOE surface, that satisfies the Bragg condition such that the incoming light is diffracted by the interference fringe grating structure of the HOE, which is further discussed below. It is to be noted that the activating angle does not have to be a single value and can be a range of angles. The Bragg condition is well known in the optics art, and it is, for example, defined in *Coupled Wave Theory for Thick Hologram Gratings*, by H. Kogelnik, The Bell System Technical Journal, Vol. 48, No. 9, p 2909–2947 (November 1969). The description of the Bragg condition disclosed therein is incorporated by reference. The Bragg condition can be expressed as $$\cos(\phi-\theta)=K/2B$$

wherein $K=2\pi/\Lambda$, $\Lambda=$ the grating period of the interference fringes, $\theta$ is the incident angle of incoming light, $\phi$ is the slant angle of the grating and B is the average propagation constant, which can be expressed as $B=2\pi n/\lambda$, wherein n is the average refractive index and $\lambda$ is the wavelength of the light. When the Bragg condition is met, up to 100% of incoming light can be coherently diffracted.

Figure 2:
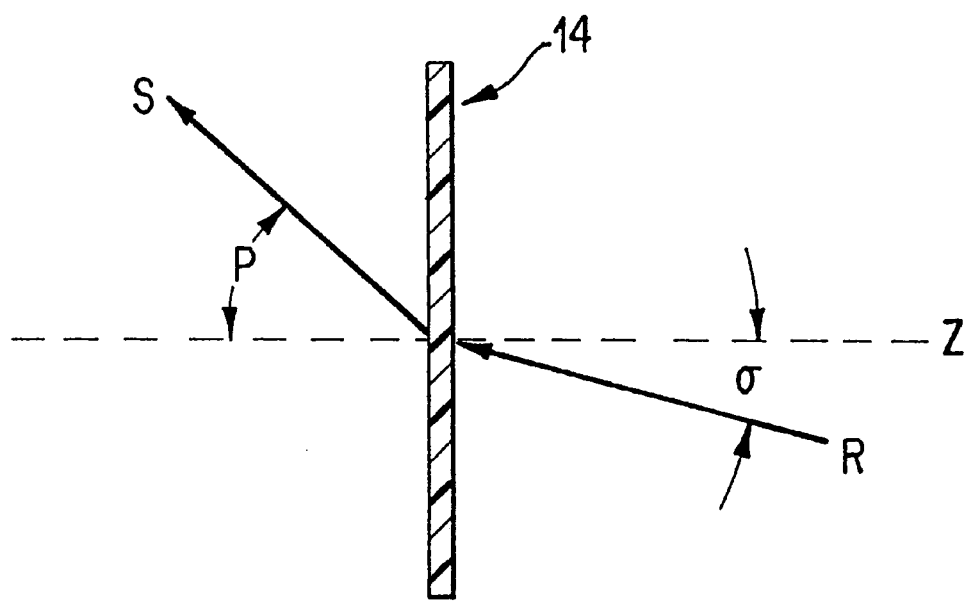
FIG. 2 illustrates the diffraction function of the holographic optical element for an active lens of the present invention.

FIG. 2 further illustrates the function of the HOE 14 of the bifocal active lens 10 of FIG. 1. The z-axis, which is normal to the planar surface of the HOE 14, and the advancing direction of the incoming light R form the incident angle σ. When the incoming light R enters the HOE 14 at an incident angle that is within the activating angle of the HOE 14, the light R is diffracted by the pre-programmed interference fringe pattern, i.e., the volume grating structure, of the HOE 14 and exits the HOE 14 as outgoing light S with an exiting angle ρ which is different from the incident angle σ.

Figure 3:
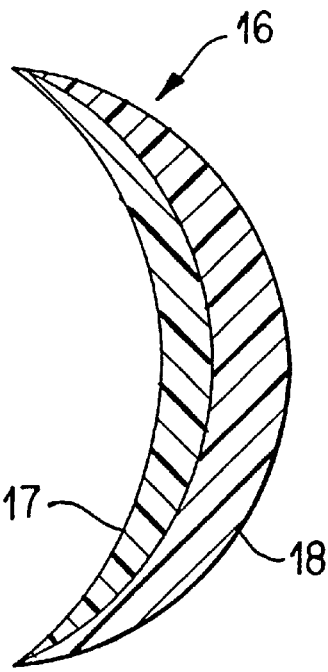
FIG. 3 illustrates an active ophthalmic lens of the present invention.

FIG. 3 illustrates another embodiment of the active bifocal lens of the present invention. The bifocal active lens 16 is a composite lens which has a first optical lens 17 and an HOE lens 18, which completely covers the first optical lens 17. Alternatively, the HOE lens 18 can be of a size that covers only the pupil of the eye. The first optical lens 17 and the HOE lens 18 can be fabricated separately and joined, e.g., adhesively or thermally. Alternatively, the first optical lens 17 and the HOE lens 18 can be sequentially or simultaneously fabricated one over the other such that a composite lens is produced. This approach is particularly suited when the first optical lens and the HOE lens are produced from one basic material or two chemically compatible materials. Although the active lens 16 is illustrated with a lens having an inner half first optical lens and an outer half HOE lens, other combinations of various optical elements can be produced in accordance with the present invention.

Yet another embodiment of the active bifocal lens is a non-composite active HOE bifocal lens. In this embodiment, the active HOE bifocal active lens is produced from an optical material that forms an HOE. The combination of the shape of the active lens and the refractive index of the HOE material provides a first optical power and the programmed volume grating structure in the HOE lens provides a second optical power. This non-composite active HOE lens embodiment is particularly suitable when the HOE material employed is a biocompatible material and, thus, does not adversely interact with the ocular tissues in the eye. Exemplary biocompatible materials that can be used to produce an HOE suitable for the present invention are disclosed in U.S. Pat. No. 5,508,317 to Beat Müller and International Patent Application No. PCT/EP96/00246 to Mühlebach, which patent and patent application are herein incorporated by reference and further discussed below. Suitable biocompatible optical materials are highly photocrosslinkable or photopolymerizable optical materials which include derivatives and copolymers of a polyvinyl alcohol, polyethyleneimine, or polyvinylamine.

Figure 4:
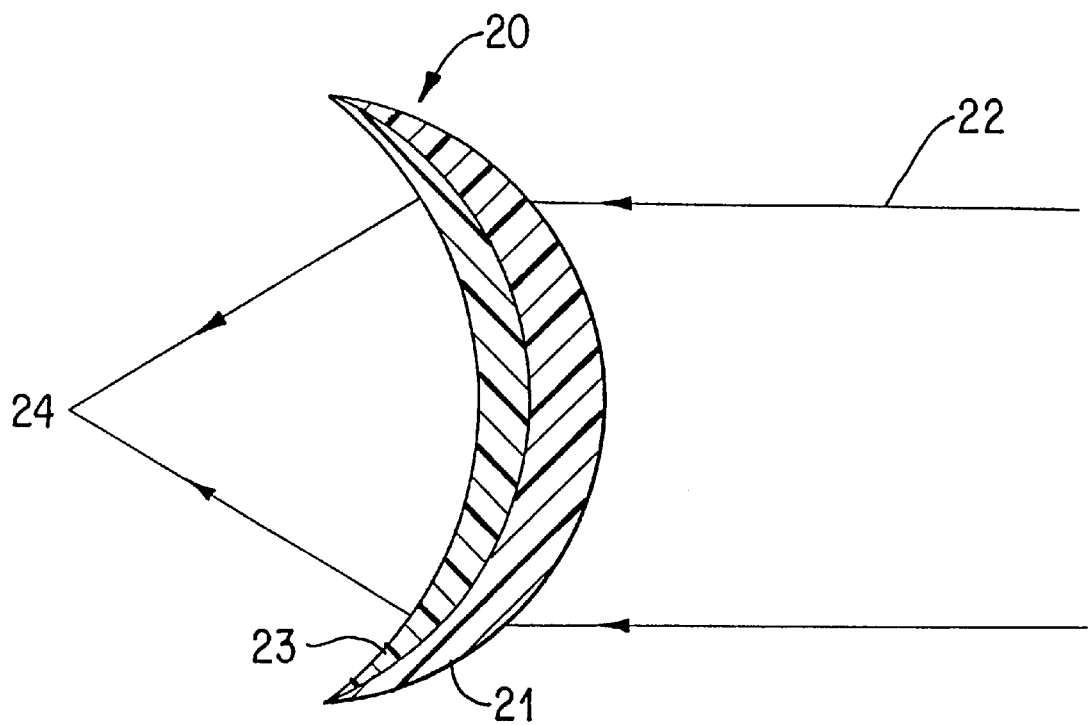
FIG. 4 illustrates the transmission function of the holographic optical element.
Figure 5:
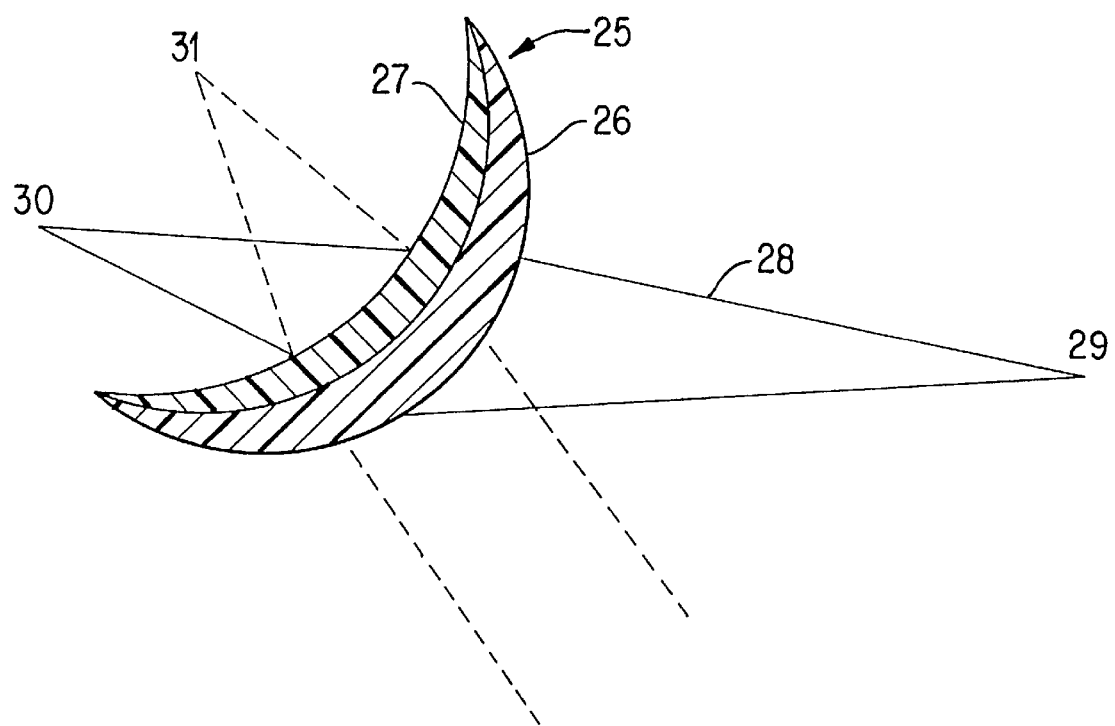
FIG. 5 illustrates the diffraction function of the holographic optical element when the element is activated.

The present HOE is designed or programmed to have one activating angle or a range of activating angles within which the HOE is activated, and the HOE diffracts the incoming light to focus the light on a desired location. FIG. 4 illustrates the function of the HOE 21 of the composite active lens 20, which contains an HOE lens element that is programmed to focus light originating from a near distance. When light 22 from a distant object enters the lens at an angle that does not activate the HOE 21, the light 20 is focused in accordance with the optical power of the first optical element 23 of the lens 10, in combination with the optical power of the crystalline lens of the eye (which is not shown), to a focal point 24 on the retina of the eye, more specifically on the fovea. For example, the first optical element 23 can have a corrective power in the range between +10 diopters and −20 diopters. It is to be noted that the HOE lens 21 may have an inherent optical power that comes from the shape of the HOE lens 21 and the refractive index of the HOE composition. Consequently, the HOE lens 21 may contribute to the optical power of the active lens 20. Notwithstanding, hereinafter, the inherent optical power of the HOE lens 21 is ignored in order to simplify the illustration of the diffractive function of the present HOE lens since the inherent optical power can be easily factored into the teaching of the present invention. When the HOE lens 21 is not activated, the HOE lens 21 does not interfere with the light 22 from traveling the normal refractive path caused by the first optical lens element 23. However, when the light enters the HOE lens 21 at an angle that activates the HOE lens 21 (i.e., enters within the activating angle), the light is diffracted by the HOE lens 21. As illustrated in FIG. 5, when the incoming light enters the active lens 25 at an angle that activates the HOE lens 26, the lens, in conjunction with the first optical lens 27 and the crystalline lens of the eye, focuses the light on the retina, more specifically on the fovea. For example, light 28 originating from a near object 29 forms an image 30 on the fovea, when the light enters the HOE lens 26 at an angle that is within the programmed activating angle.

The incident angle of incoming light with respect to the active bifocal lens, more specifically to the HOE portion of the active lens, can be changed by various means. For example, the active lens can be tilted to change the incident angle of the incoming light, i.e., the wearer of the lens can change the incident angle of the light by looking down while maintaining the position of the head. Alternatively, the active lens may have a position controlling mechanism that can be actively controlled by the wearer of the lens with one or more muscles in the eye. For example, the active lens can be shaped to have a prim ballast such that the movement of the lens can be controlled with the lower eyelid. It is to be noted that the activating angle of the active lens 25 illustrated in FIG. 5 is exaggerated to more easily explain the present invention, and thus, the activating angle of the active lens does not have to be as large as the tilted angle illustrated in FIG. 5. In fact, HOEs suitable for the present invention can be programmed to have a wide range of different activating angles in accordance with HOE programming methods known in the holographic art. Accordingly, the degree of movement required for the active lens to switch from one optical power to another can be easily changed depending on the design criteria and the needs of each lens wearer.

Although the active lens of the present invention provides more than one optical power, the active lens forms clearly perceivable images that are focused by one optical power at a time. Consequently, the active lens does not produce blurred or fogged images, unlike conventional bifocal lenses such as concentric simultaneous bifocal lenses. Returning to FIG. 5, when the active lens 25 is positioned to view a near object 29 (i.e., the incident angle of the light originating from the object 29 is within the activating angle of the HOE lens 26), the light from the object 29 is focused by the HOE lens 26, in conjunction with the first optical lens 27 and the crystalline lens of the eye, onto the fovea 30. At the same time, the incident angle of the light originating from distant objects is not within the activating angle of the active lens 25. Accordingly, the path of the incoming light from distant objects is not modified by the HOE lens 26, but the path of the incoming light from distant objects is modified, i.e., refracted, by the first optical lens 27 and the crystalline lens of the eye. The incoming light from the distant objects is, therefore, focused to forms an image at an area 31 which is outside the fovea. Consequently, the focused images of the near and distant objects are not concentrically or axially aligned. It has been found that the image, which is formed outside the fovea 31, is not clearly perceived by the wearer of the active lens 25 and is easily disregarded as peripheral vision. Consequently, the wearer of the active lens 25 is able to clearly view the near object 29 without having blurring interferences from the light originating from distant objects.

Similarly, when the active lens is position to view a distant object, for example, as illustrated in FIG. 4, the light 22 from distant objects enters the lens at an angle outside the activating angle of the HOE 21. Therefore, the path of the light is not affected by the HOE 21, and is only affected by the first optical element 23 and the crystalline lens of the eye, thereby forming an image of the distant object on or near the fovea 24. At the same time, the light originating from a near object is diffracted and focused by the HOE 21 and is projected onto an area outside the fovea. Accordingly, the wearer of the active lens clearly views the distant object without significant interferences.

The non-blurring advantage of the present active lens is a result of the design of the active lens that utilizes the inherent anatomy of the eye. It is known that the concentration of the retinal receptors outside the fovea is drastically lower than that in the fovea. Consequently, any image focused substantially outside of the fovea is not clearly perceived since the image is undersampled by the retina and easily disregarded by the brain of the lens wearer as peripheral vision or images. In fact, it has been found that the visual acuity of a human eye drops to about 20/100 for objects only 8° off the line of sight. In the above-described actively controlling manner, the present active lens provides clear images from one optical power at a time by utilizing the inherent anatomy of the eye. Utilizing the inherent retinal receptor anatomy of the eye and the ability to program different ranges of activating angles in the HOE lens, the present active lens uniquely and selectively provides clear images of objects that are located at different distances. In contrast to various simultaneous bifocal lenses, the active lens provides unimpeded clear images, and in contrast to translating bifocal lenses, the active lens can be easily designed to require only a small movement of the lens to selectively provide images from different distances.

Figure 6:
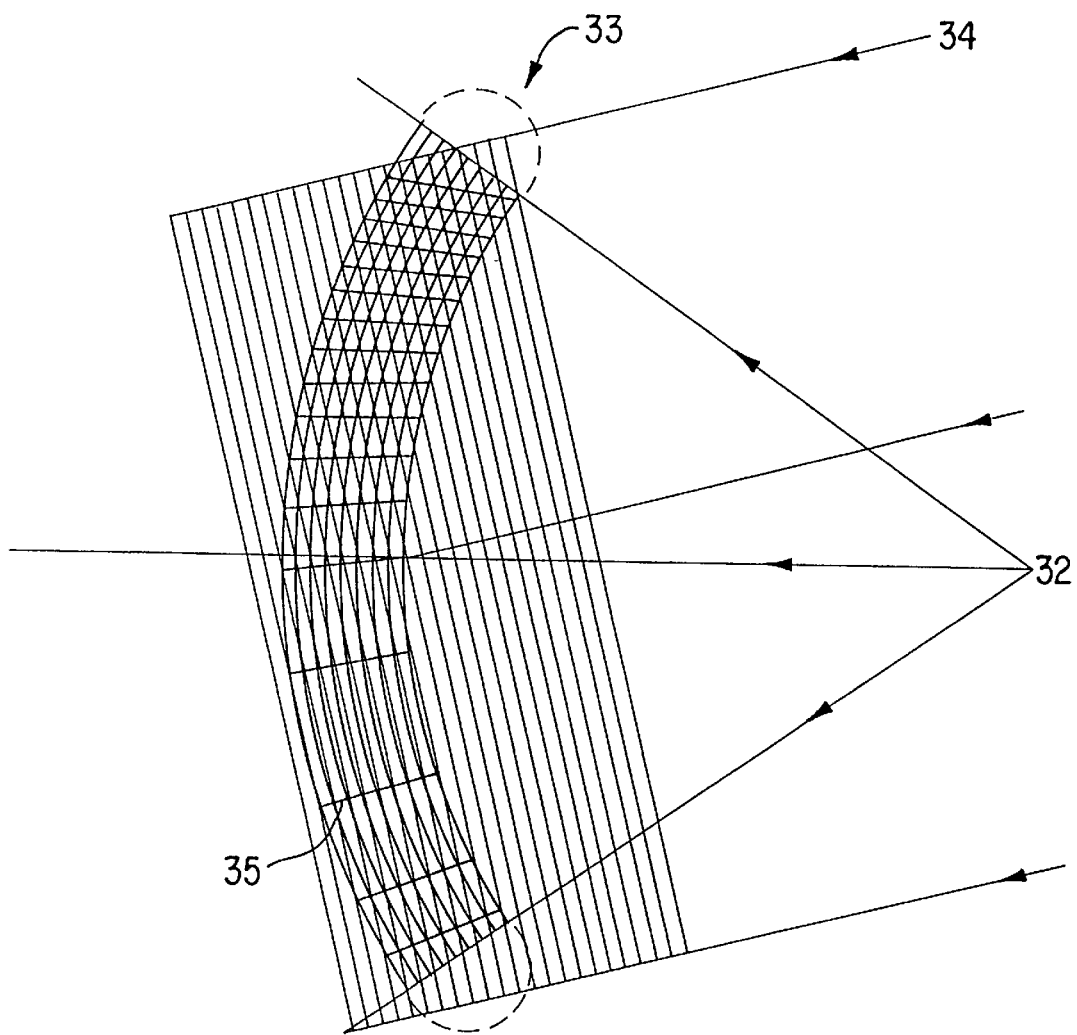
FIG. 6 illustrates an exemplary method for producing the holographic optical element.
Figure 7:
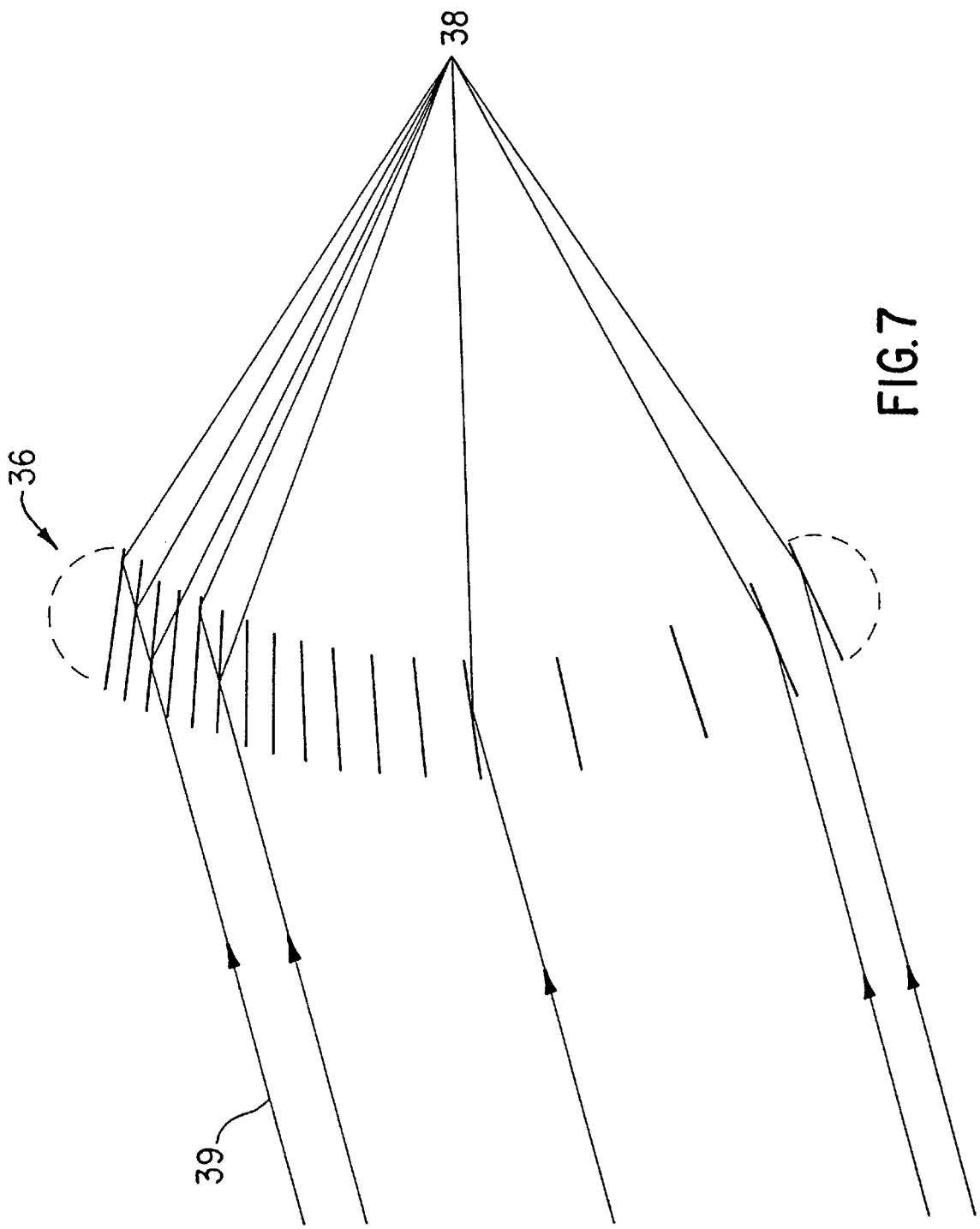
FIG. 7 illustrates the optical power of the holographic optical element.

HOEs suitable for the present invention can be produced, for example, from a polymerizable or crosslinkable optical material. Suitable polymerizable and crosslinkable HOE materials are further discussed below. Hereinafter, for illustration purposes, the term polymerizable material is used to indicate both polymerizable and crosslinkable materials, unless otherwise indicated. An exemplary process for producing an HOE of the present invention is illustrated in FIG. 6. Point-source object light 32 is projected to a photopolymerizable optical material 33 (i.e., photopolymerizable HOE), and simultaneously collimated reference light 34 is projected to the photopolymerizable HOE 33 such that the electromagnetic waves of the object light 32 and the reference light 34 form interference fringe patterns, which are recorded in the polymerizable material as it is polymerized, thereby forming a volume grating structure in the lens 33. The photopolymerizable HOE 33 is a photopolymerizable material that is polymerized by both the object light and the reference light. Preferably, the object light and the reference light are produced from one light source using a beam splitter. The two split portions of the light are projected toward the HOE 33, in which the path of the object light portion of the split light is modified to form a point-souce light 32. The point-source object light 32 can be provided, for example, by placing a conventional convex optical lens some distance away from the photopolymerizable HOE 33 so that the light is focused on a desirable distance away from the HOE 33, i.e., on the point-source light position 32. A preferred light source is a laser source, more preferred is a U.V. laser source. Although the suitable wavelength of the light source depends on the type of HOE employed, preferred wavelength ranges are between 300 nm and 600 nm. When the photopolymerizable HOE 33 is fully exposed and polymerized, the resulting HOE contains a pattern of refractive index modulation, i.e., the volume grating structure 35. Turning to FIG. 7, the polymerized HOE 36 has a focal point 38 which corresponds to the position of the point-source object light 32 of FIG. 6 when light 39 enters the HOE 36 from the opposite side of the focal point and matches or substantially matches the reversed path of the collimated reference light 34 of FIG. 6. FIGS. 6 and 7 provide an exemplary method for producing an HOE having a positive corrective power. As can be appreciated, HOEs having a negative corrective power can also be produced with the above-described HOE production set up with small modifications. For example, a convergent object light source that forms a focal point on the other side of the HOE away from the light source can be used in place of the point-source object light to produce an HOE having a negative corrective power. In accordance with the present invention, active multifocal lenses having various corrective powers can be readily and simply produced to correct various ametropic conditions, e.g., myopia, hyperopia, prebyopia, regular astigmatism, irregular astigmatism and combinations thereof. For example, the corrective powers of the HOEs can be changed by changing the distance, position and/or path of the object light, and the activating angle of the HOEs can be changed by changing the positions of the object light and the reference light.

In accordance with the present invention, suitable HOEs can be produced from polymerizable and crosslinkable optical materials that can be relatively rapidly photopolymerized or photocrosslinked. A rapidly polymerizable optical material allows a periodic variation in the refractive index can be created within the optical material, thereby forming a volume grating structure while the optical material is being polymerized to form a solid optical material. An exemplary group of polymerizable optical materials suitable For the present invention is disclosed in U.S. Pat. No. 5,508,317 to Beat Müller. A preferred group of polymerizable optical materials, as described in U.S. Pat. No. 5,508,317, are those that comprise a 1,3-diol basic structure in which a certain percentage of the 1,3-diol units have been modified to a 1,3-dioxane having in the 2-position a radical that is polymerizable but not polymerized. The polymerizable optical material is preferably a derivative of a polyvinyl alcohol having a weight average molecular weight, $M_w$, of at least about 2,000 that, based on the number of hydroxy groups of the polyvinyl alcohol, comprises from about 0.5% to about 80% of units of formula I:

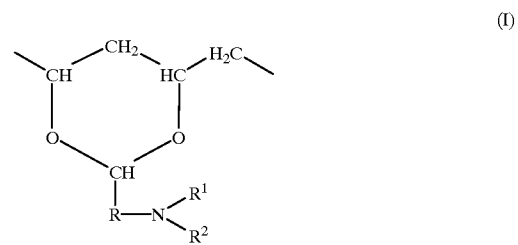

wherein:

R is lower alkylene having up to 8 carbon atoms, $R^1$ is hydrogen or lower alkyl and $R^2$ is an olefinically unsaturated, electron-attracting, copolymerizable radical preferably having up to 25 carbon atoms. $R^2$ is, for example, an olefinically unsaturated acyl radical of formula $R^3$—CO—, in which $R^3$ is an olefinically unsaturated copolymerizable radical having from 2 to 24 carbon atoms, preferably from 2 to 8 carbon atoms, especially preferably from 2 to 4 carbon atoms.

In another embodiment, the radical $R^2$ is a radical of formula II

wherein q is zero or one;

$R^4$ and $R^5$ are each independently lower alkylene having from 2 to 8 carbon atoms, arylene having from 6 to 12 carbon atoms, a saturated divalent cycloaliphatic group having from 6 to 10 carbon atoms, arylenealkylene or alkylenearylene having from 7 to 14 carbon atoms, or arylenealkylenearylene having from 13 to 16 carbon atoms; and $R^3$ is as defined above.

Lower alkylene R preferably has up to 8 carbon atoms and may be straight-chained or branched. Suitable examples include octylene, hexylene, pentylene, butylene, propylene, ethylene, methylene, 2-propylene, 2-butylene and 3-pentylene. Preferably lower alkylene R has up to 6 and especially preferably up to 4 carbon atoms. Methylene and butylene are especially preferred. $R^1$ is preferably hydrogen or lower alkyl having up to seven, especially up to four, carbon atoms, especially hydrogen.

As for $R^4$ and $R^5$, lower alkylene $R^4$ or $R^5$ preferably has from 2 to 6 carbon atoms and is especially straight-chained. Suitable examples include propylene, butylene, hexylene, dimethylethylene and, especially preferably, ethylene. Arylene $R^4$ or $R^5$ is preferably phenylene that is unsubstituted or is substituted by lower alkyl or lower alkoxy, especially 1,3-phenylene or 1,4-phenylene or methyl-1,4-phenylene. A saturated divalent cycloaliphatic group $R^4$ or $R^5$ is preferably cyclohexylene or cyclohexylene-lower alkylene, for example cyclohexylenemethylene, that is unsubstituted or is substituted by one or more methyl groups, such as, for example, trimethylcyclohexylenemethylene, for example the divalent isophorone radical. The arylene unit of alkylenearylene or arylenealkylene $R^4$ or $R^5$ is preferably phenylene, unsubstituted or substituted by lower alkyl or lower alkoxy, and the alkylene unit thereof is preferably lower alkylene, such as methylene or ethylene, especially methylene. Such radicals $R^4$ or $R^5$ are therefore preferably phenylenemethylene or methylenephenylene. Arylenealkylenearylene $R^4$ or $R^5$ is preferably phenylene-lower alkylene-phenylene having up to 4 carbon atoms in the alkylene unit, for example phenyleneethylenephenylene. The radicals $R^4$ and $R^5$ are each independently preferably lower alkylene having from 2 to 6 carbon atoms, phenylene, unsubstituted or substituted by lower alkyl, cyclohexylene or cyclohexylene-lower alkylene, unsubstituted or substituted by lower alkyl, phenylene-lower alkylene, lower alkylene-phenylene or phenylene-lower alkylene-phenylene.

The polymerizable optical materials of the formula I be produced, for example, by reacting a polyvinylalcohol with a compound III,

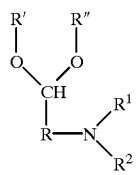

(III)

wherein R, $R^1$ and $R^2$ are as defined above, and R' and R" are each independently hydrogen, lower alkyl or lower alkanoyl, such as acetyl or propionyl. Desirably, between 0.5 and about 80% of the hydroxyl groups of the resulting the polymerizable optical material are replaced by the compound III.

Another group of exemplary polymerizable optical materials suitable for the present invention is disclosed in International Patent Application No. PCT/EP96/00246 to M ühlebach. Suitable optical materials disclosed therein include derivatives of a polyvinyl alcohol, polyethyleneimine or polyvinylamine which contains from about 0.5 to about 80%, based on the number of hydroxyl groups in the polyvinyl alcohol or the number of imine or amine groups in the polyethyleneimine or polyvinylamine, respectively, of units of the formula IV and V:

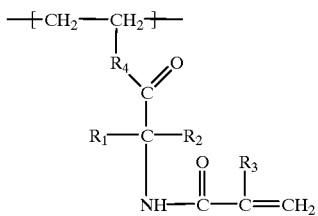

(IV)

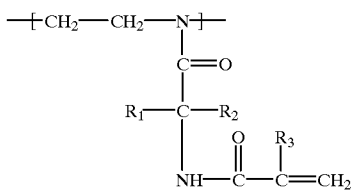

(V)

wherein $R_1$ and $R_2$ are, independently of one another, hydrogen, a $C_1$–$C_8$ alkyl group, an aryl group, or a cyclohexyl group, wherein these groups are unsubstitued or substituted; $R_3$ is hydrogen or a $C_1$–$C_8$ alkyl group, preferably is methyl; and $R_4$ is an —O— or —NH— bridge, preferably is —O—. Polyvinyl alcohols, polyethyleneimines and polyvinylamines suitable for the present invention have a number average molecular weight between about 2000 and 1,000,000, preferably between 10,000 and 300,000, more preferably between 10,000 and 100,000, and most preferably 10,000 and 50,000. A particularly suitable polymerizable optical material is a water-soluble derivative of a polyvinyl alcohol having between about 0.5 to about 80%, preferably between about 1 and about 25%, more preferably between about 1.5 and about 12%, based on the number of hydroxyl groups in the polyvinyl alcohol, of the formula III that has methyl groups for $R_1$ and $R_2$, hydrogen for $R_3$, —O— (i.e., an ester link) for $R_4$.

The polymerizable optical materials of the formulae IV and V can be produced, for example, by reacting an azalactone of the formula VI,

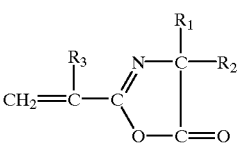

(VI)

wherein $R_1$, $R_2$ and $R_3$ are as defined above, with a polyvinyl alcohol, polyethyleneimine or polyvinylamine at elevated temperature, between about 55° C. and 75° C., in a suitable organic solvent, optionally in the presence of a suitable catalyst. Suitable solvents are those which dissolve the polymer backbone and include aprotic polar solvents, e.g., formamide, dimethylformamide, hexamethylphosphoric triamide, dimethyl sulfoxide, pyridine, nitromethane, acetonitrile, nitrobenzene, chlorobenzene, trichloromethane and dioxane. Suitable catalyst include tertiary amines, e.g., triethylamine, and organotin salts, e.g., dibutyltin dilaurate.

Another group of HOEs suitable for the present invention can be produced from conventional volume transmission holographic optical element recording media. As with the above-described polymerizable materials for HOEs, object light and collimated reference light are simultaneously projected onto an HOE recording medium such that the electromagnetic waves of the object and reference light form interference fringe patterns. The interference fringe patterns, i.e., volume grating structure, are recorded in the HOE medium. When the HOE recording medium is fully exposed, the recorded HOE medium is developed in accordance with a known HOE developing method. Suitable volume transmission holographic optical element recording media include commercially available holographic photography recording materials or plates, such as dichromatic gelatins. Holographic photography recording materials are available from various manufacturers, including Polaroid Corp. When photographic recording materials are used for the HOE, however, the presence of toxicological effects of the material on the ocular environment must be considered. Accordingly, when a conventional photographic HOE material is used, it is preferred that the HOE be encapsulated in a biocompatible optical material. Useful biocompatible optical materials for encapsulating the HOE include optical materials that are suitable for the first optical of the present active lens, and such suitable materials are further discussed below.

Figure 8:
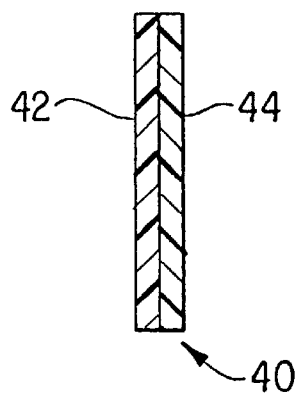
FIGS. 8, 8A and 8B illustrate a combination holographic optical element of the present invention.
Figure 8A:
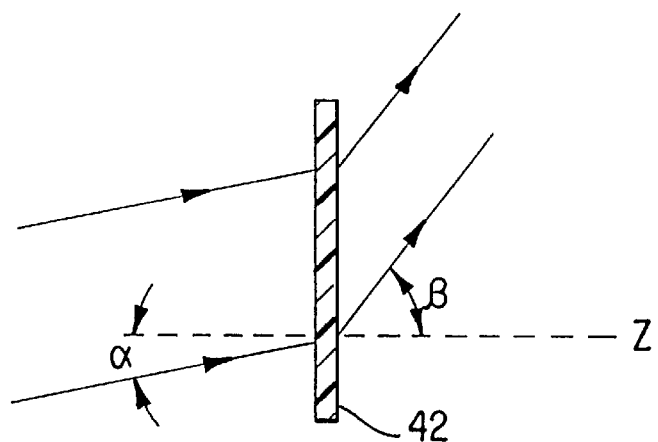
Figure 8B:
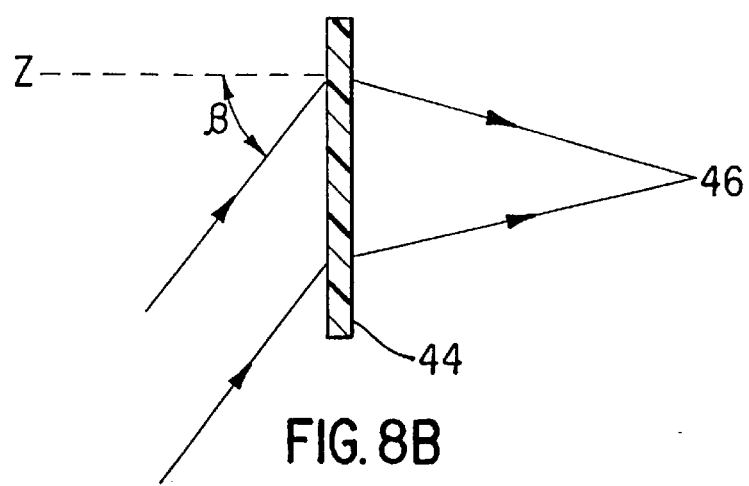

As is known in the ophthalmic art, an ophthalmic lens should have a thin dimensional thickness to promote comfort of the lens wearer. Accordingly, a dimensionally thin HOE is preferred for the present invention. However, in order to provide an HOE having a high diffractive efficiency, the HOE has to be optically thick, i.e., the light is diffracted by more than one plane of the interference fringe pattern. One way to provide an optically thick and dimensionally thin HOE is programming the interference fringe pattern in a direction that is slanted towards the length of the HOE. Such slanted volume grating structure renders the HOE to have a large angular deviation between the incident angle of the incoming light and the exiting angle of the exiting light. However, an HOE having a large angular deviation may not be particularly suitable for an optical lens. For example, when such an HOE is used in an ophthalmic lens and the HOE is activated, the active line of sight is significantly bent away from the normal straight line of sight. As a preferred embodiment of the present invention, this angular limitation in designing an HOE lens is addressed by utilizing a multilayer combination HOE, especially a bilayer HOE. FIG. 8 illustrates an exemplary multilayer HOE 40 of the present invention. Two dimensionally thin HOEs having a large angular deviation are fabricated into a combination HOE to provide a dimensionally thin HOE that has a small angular deviation. The combination HOE 40 has a dimensionally thin first HOE 42 and a thin second HOE 44. The first HOE 42 is programmed to diffract the incoming light such that when light enters the HOE at an activating angle $\alpha$, the light exiting the HOE 42 forms an exiting acute angle $\beta$, which is larger than the incident angle $\alpha$, as shown in FIG. 8A. Preferably, the first HOE has a thickness between about 10 $\mu$m and about 100 $\mu$m, more preferably between about 20 $\mu$m and about 90 $\mu$m, most preferably between about 30 $\mu$m and about 50 $\mu$m. The second HOE 44 is programmed to have a activating incident angle $\beta$ that matches the exiting angle $\beta$ of the first HOE 42. In addition, the second HOE 44 is programmed to focus the incoming light to a focal point 46 when the light enters within the activating angle $\beta$. FIG. 8B illustrates the second HOE 44. Preferably, the second HOE has a thickness between about 10 $\mu$m and about 100 $\mu$m, more preferably between about 20 $\mu$m and about 90 $\mu$m, most preferably between about 30 $\mu$m and about 50 $\mu$m.

When the first HOE 42 is placed next to the second HOE 44 and the incoming light is directed at an angle that corresponds to the activating angle $\alpha$ of the first HOE 42, the light exiting the multilayer HOE focuses the light to the focal point 46. By utilizing a multilayer combination HOE, a dimensionally thin HOE having a high diffractive efficiency and a small deviation angle can be produced. In addition to the high diffractive efficiency and small angular deviation advantages, utilizing a multilayer HOE provides other additional advantages, which include correction of dispersion aberration and chromatic aberration. A single HOE may produce images having dispersion and chromatic aberrations since visual light consists of a spectrum of electromagnetic waves having different wave lengths and the differences in wavelengths may cause the electromagnetic waves to diffract differently by the HOE. It has been found that a multilayer, especially bilayer, HOE can counteract to correct these aberrations that may be produced by a single layer HOE. Accordingly, a multilayer combination HOE is preferred as the HOE component of the active lens.

In accordance with the present invention, HOEs of the present invention preferably have a diffraction efficiency of at least about 75%, more preferably at least about 80%, most preferably at least 95%, over all or substantially all wavelengths within the visible spectrum of light. Especially suitable HOEs for the present invention have a diffraction efficiency of 100% over all wavelengths of the spectrum of visible light. However, HOEs having a lower diffraction efficiency than specified above can also be utilized for the present invention. Additionally, the preferred HOE for the present invention has a sharp transition angle between the activated and non-activated stages, and not a gradual transition angle, such that activation and deactivation of the HOE can be achieve by a small movement of the active lens and that no or minimal transitional images are formed by the HOE during the movement between the activated and deactivated stages.

As for the first optical material of the active lens, a polymeric or non-polymeric optical material suitable for a hard lens, gas permeable lens or hydrogel lens can be used. Suitable polymeric materials for the first optical element of the active ophthalmic lens include hydrogel materials, rigid gas permeable materials and rigid materials that are known to be useful for producing ophthalmic lenses, e.g., contact lenses. Suitable hydrogel materials typically have a cross-linked hydrophilic network and hold between about 35% and about 75%, based on the total weight of the hydrogel material, of water. Examples of suitable hydrogel materials include copolymers having 2-hydroxyethyl methacrylate and one or more comonomers such as 2-hydroxy acrylate, ethyl acrylate, methyl methacrylate, vinyl pyrrolidone, N-vinyl acrylamide, hydroxypropyl methacrylate, isobutyl methacrylate, styrene, ethoxyethyl methacrylate, methoxy triethyleneglycol methacrylate, glycidyl methacrylate, diacetone acrylamide, vinyl acetate, acrylamide, hydroxytrimethylene acrylate, methoxy methyl methacrylate, acrylic acid, methacrylic acid, glyceryl ethacrylate and dimethylamino ethyl acrylate. Other suitable hydrogel materials include copolymers having methyl vinyl carbazole or dimethylamino ethyl methacrylate. Another group of suitable hydrogel materials include polymerizable materials such as modified polyvinyl alcohols, polyethyleneimines and polyvinylamines, for example, disclosed in U.S. Pat. No. 5,508,317, issued to Beat Müller and International Patent Application No. PCT/EP96/01265. Yet another group of highly suitable hydrogel materials include silicone copolymers disclosed in International Patent Application No. PCT/EP96/01265. Suitable rigid gas permeable materials for the present invention include cross-linked siloxane polymers. The network of such polymers incorporates appropriate cross-linkers such as N,N'-dimethyl bisacrylamide, ethylene glycol diacrylate, trihydroxy propane triacrylate, pentaerythtritol tetraacrylate and other similar polyfunctional acrylates or methacrylates, or vinyl compounds, e.g., N-m,ethylamino divinyl carbazole. Suitable rigid materials include acrylates, e.g., methacrylates, diacrylates and dimethacrylates, pyrolidones, styrenes, amides, acrylamides, carbonates, vinyls, acrylonitrieles, nitriles, sulfones and the like. Of the suitable materials, hydrogel materials are particularly suitable for the present invention.

In accordance with the present invention, the first optical element and the HOE can be laminated or the HOE can be encapsulated in the first optical element to form the active lens, when one of the composite active lens embodiments is practiced. In addition, when an ophthalmic active lens is produced using a non-biocompatible HOE, the HOE preferably is encapsulated in the first optical element such that the HOE does not make direct contact with the ocular environment since the HOE may adversely affect the long-term corneal health. Alternatively, as discussed above, the active lens can be produced from a biocompatible HOE such that an HOE can provide both diffractive and refractive functions of the active lens.

Figure 9:
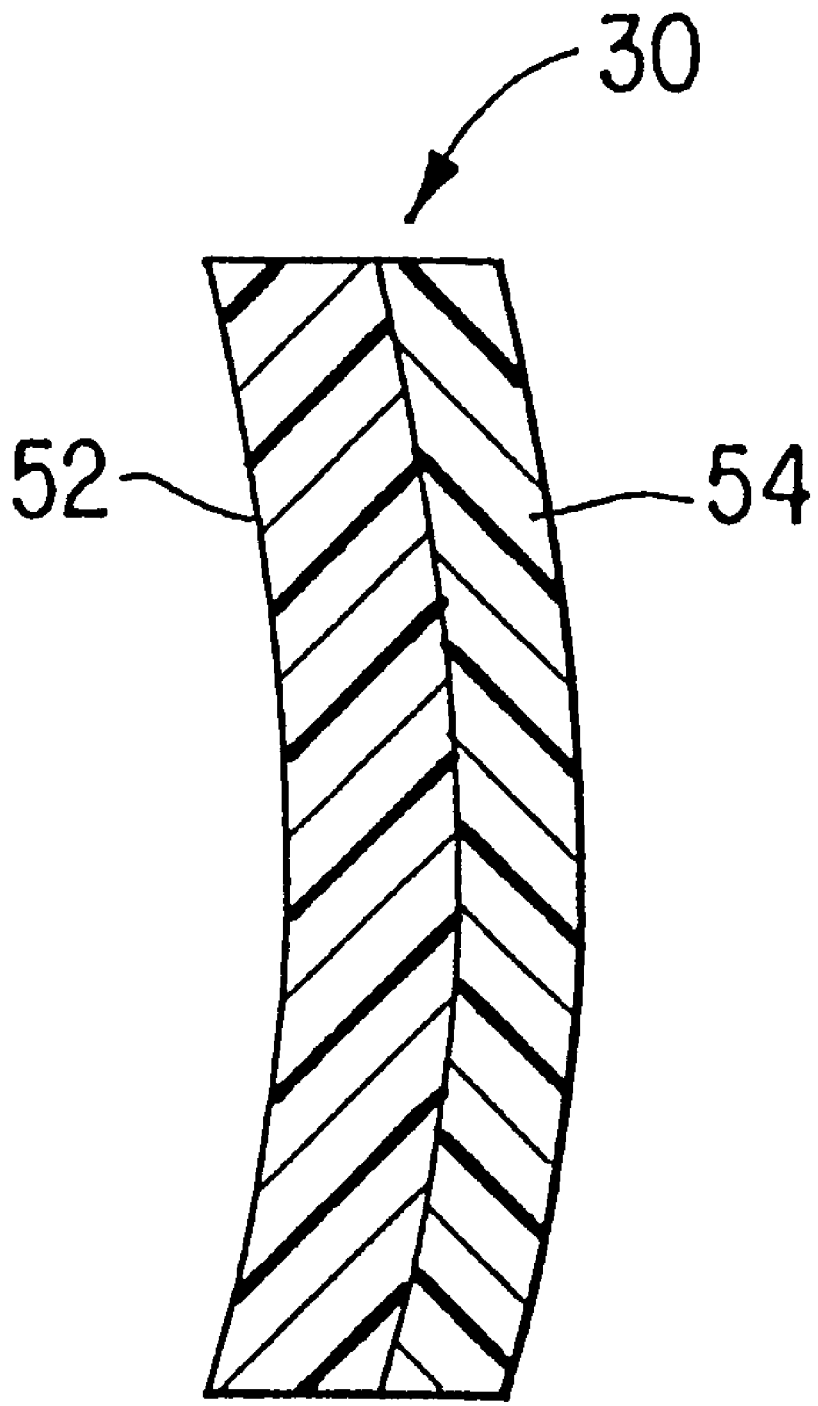
FIG. 9 illustrates a spectacle composite lens of the present invention.

FIG. 9 illustrates another embodiment of the present invention. A bifocal spectacle lens 50 is formed by laminating a layer of a first optical material having a first optical power 52, which provides an optical power, and a layer of an HOE 54, which provides a second optical power. The two layers are fabricated separately and then joined, e.g., thermally or adhesively. The composite lenses can be subsequently machined to fit a spectacle frame to provide a pair of bifocal glasses. The first optical material 52 is a conventional optical material that has been used to produce eyeglasses, e.g., glass, polycarbonate, polymethylmethacrylate or the like, and the HOE is any holographic optical material that can be programmed to focus the incoming light, as previously described.

The present multifocal optical lens can be actively and selectively controlled to provide one desired optical power at a time without or substantially without optical interferences from the other optical powers of the lens, unlike conventional bifocal lenses. In addition, the programmable nature of the HOE of the active lens makes the lens highly suitable for correcting ametropic conditions that are not easily accommodated by conventional corrective optical lenses. For example, the active lens can be programmed to have corrective measures for the unequal and distorted corneal curvature of an irregular astigmatic condition by specifically designing the object and reference light configurations.

The present invention is further illustrated with the following example. However, the example is not to be construed as limiting the invention thereto.

EXAMPLE

About 0.06 ml of the Nelfilcon A lens monomer composition is deposited in the center portion of a female mold half, and a matching male mold half is placed over the female mold half, forming a lens mold assembly. The male mold half does not touch the female mold half, and they are separated by about 0.1 mm. The lens mold halves are masked from quartz and are masked with chrome, except for the center circular lens portion of about 15 mm in diameter. Briefly, Nelfilcon A is a product of a crosslinkable modified polyvinyl alcohol which contains about 0.48 mmol/g of an acryamide crosslinker. The polyvinyl alcohol has about 7.5 mol % acetate content. Nelfilcon A has a solid content of about 31% and contains about 0.1% of a photoinitiator, Durocure® 1173. The closed lens mold assembly is placed under a laser set up. The laser set up provides two coherent collimated U.V. laser beams having 351 nm wavelength, in which one beam is passed through a optical convex lens so that the focal point is formed at 500 mm away from the lens mold assembly. The focused light serves as a point-source object light. The angle formed between the paths of the object light and the reference light is about 7°. The set up provides an HOE having an added corrective power of 2 diopters. The lens monomer composition is exposed to the laser beams having about 0.2 watts for about 2 minutes to completely polymerize the composition and to form interference fringe patterns. Since the lens mold is masked except for the center portion, the lens monomer exposed in the circular center portion of the mold is subjected to the object light and the reference light and polymerized.

The mold assembly is opened, leaving the lens adhered to the male mold half. About 0.06 ml of the nelfilcon A lens monomer composition is again deposited in the center portion of the female mold half, and the male mold half with the formed lens is placed over the female mold half. The male and female mold halves are separated by about 0.2 mm. The closed mold assembly is again exposed to the laser set up, except that the optical convex lens is removed from the object light set up. The monomer composition is again exposed to the laser beams for about 2 minutes to completely polymerize the composition and to form a second layer of interference fringe patterns. The resulting composite lens has an optical power based on the shape of the lens and the refractive index of the lens material and an activatable additional corrective power of +2 diopters.

What is claimed is:

1. A multifocal optical lens comprising a first optical element and a transmission volume holographic optical element, wherein said first optical element provides a first optical power at a first focal point, and said holographic optical element or said holographic optical element in combination with said first optical element provides a second optical power at a second focal point, wherein the axis of said first focal point is misaligned from the axis of said second focal point by an angle of greater than about 8°.

2. The multifocal optical lens of claim 1 wherein said optical lens is an ophthalmic lens and has a stabilizing mechanism.

3. The multifocal optical lens of claim 1 wherein said holographic optical element diffracts up to 100% of incoming light when the Bragg condition is met.

4. The multifocal optical lens of claim 1 wherein said first optical power is selected from +10 diopters to −20 diopters.

5. The multifocal optical lens of claim 4 wherein said second optical power is a positive optical power.

6. The multifocal optical lens of claim 1 wherein said lens corrects myopic conditions, hyperopic conditions, presbyopic conditions, regular and irregular astigmatisms and combinations thereof.

7. The multifocal optical lens of claim 1 wherein said holographic optical element is a combination holographic optical element.

8. A multifocal optical lens comprising a transmission volume holographic optical element, said optical element having a programmed activating angle, wherein said optical element provides a first optical power for light entering said optical element at an angle outside said activating angle and provides a second optical power for light entering said optical element at an angle within said activating angle.

9. The multifocal optical lens of claim 8 wherein said optical lens is an ophthalmic lens and has a stabilizing mechanism.

10. The multifocal optical lens of claim 8 wherein said optical lens is a contact lens.

11. The multifocal optical lens of claim 8 wherein said first optical power is selected from +10 diopters to −20 diopters.

12. The multifocal optical lens of claim 11 wherein said second optical power is a positive optical power.

13. The multifocal optical lens of claim 8 wherein said lens corrects myopic conditions, hyperopic conditions, presbyopic conditions, regular and irregular astigmatisms and combinations thereof.

14. The multifocal optical lens of claim 8 wherein said holographic optical element is a combination holographic optical element.

15. A method for correcting an ametropic condition, comprising the steps of:
 a) providing a multifocal lens on an eye, said multifocal lens comprising a first optical element and a transmission holographic optical element, wherein said first optical element provides a first optical power at a first focal point, and said holographic optical element or said holographic optical element in combination with said first optical element provides a second optical power at a second focal point; and
 b) moving said multifocal lens on said eye such that only one of said first focal point or said second focal point is selectively placed on the fovea of said eye.

16. The method of claim 15 wherein said optical lens is an ophthalmic lens and has a stabilizing mechanism such that said lens can be stably moved from one position to another.

17. The method of claim 15 wherein said holographic optical element diffracts up to 100% of incoming light when the Bragg condition is met.

18. The method of claim 15 wherein said ametropic condition is a myopic condition, a hyperopic condition, a presbyopic condition, a regular or irregular astigmatism or a combination thereof.

19. The method of claim 18 wherein said ametropic condition is a presbyopic condition and said first optical power is selected from +10 diopters to −20 diopters.

20. The method of claim 18 wherein said holographic optical element is a combination holographic optical element.

21. A method for providing a multifocal vision correction, comprising the steps of:

a) providing a multifocal lens on an eye, said multifocal lens comprising a holographic optical element, said optical element having a programmed activating angle, wherein said optical element provides a first optical power for light entering said optical element at an angle outside said activating angle and provides a second optical power for light entering said optical element at an angle within said activating angle; and
 b) moving said multifocal lens on said eye such that said first focal point or said second focal point is selectively placed on the fovea of said eye.

22. The method of claim 21 wherein said optical lens is an ophthalmic lens and has a stabilizing mechanism such that said lens can be stably moved from one position to another.

23. The method of claim 21 wherein said holographic optical element diffracts up to 100% of incoming light when the Bragg condition is met.

24. The method of claim 21 wherein said ametropic condition is a myopic condition, a hyperopic condition, a presbyopic condition, a regular or irregular astigmatism or a combination thereof.

25. The method of claim 24 wherein said ametropic condition is a presbyopic condition and said first optical power is selected from +10 diopters to −20 diopters.

26. The method of claim 25 wherein said holographic optical element is a combination holographic optical element.

27. A method for producing a multifocal optical lens for correcting ametropic conditions, said lens having a front curve and a base curve, which method comprises the steps of:
 a) introducing a polymerizable optical material in a mold for an optical lens; and
 b) exposing said polymerizable material in said mold to electromagnetic waves, wherein said electromagnetic waves form a pattern of interference fringes while polymerizing said polymerizable material, thereby said pattern is recorded in said lens to form a volume grating structure, thereby forming a volume holographic element,
  wherein said pattern diffracts light entering said front curve to correct said ametropic conditions when placed on, in or in front of an eye.

* * * * *